United States Patent [19]
Cote et al.

[11] Patent Number: 5,870,556
[45] Date of Patent: Feb. 9, 1999

[54] MONITORING A MESSAGING LINK

[75] Inventors: Joseph Paul-Emile Pierre Cote, Issaquah; Stephen David Thomas, Bellevue, both of Wash.

[73] Assignee: Microsoft Corporation, Redmond, Wash.

[21] Appl. No.: 678,989

[22] Filed: Jul. 12, 1996

[51] Int. Cl.$^6$ .................................................. H01J 13/00
[52] U.S. Cl. ................................ 395/200.54; 395/200.66; 340/825.08; 370/245; 370/248; 370/249
[58] Field of Search .................. 395/200.54, 200.66, 395/200.67, 200.58, 200.6, 200.36, 200.37, 712; 340/825.08; 370/241, 242, 243, 244, 245, 246, 247, 248, 249, 250, 251, 252, 253

[56] References Cited

U.S. PATENT DOCUMENTS

| | | | |
|---|---|---|---|
| 5,095,444 | 3/1992 | Motles | 395/200.54 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,627,766 | 5/1997 | Beaven | 364/551.01 |
| 5,644,717 | 7/1997 | Clark | 395/200.54 |

OTHER PUBLICATIONS

Muuss, Mike, ping program, ftp://ftp.freebsd.org/pub/FreeBSD/FreeBSD-current/src/sbin/ping/ping.c, 1993.
RFC 792, Sep. 1981.
RFC 1122, http://once2.sm.sony.co.jp/net-docs/rfc/1122/internet.html@sec3.2.2, Aug. 1989.
Shirley, John and Rosenberry, Ward, "Microsoft RPC Programming Guide", O'Reilly & Associates, 1995.
Kramer, Matt, "Baranof's MailCheck 2.6 Delivers Improved Tools", PC Week, Sep. 11, 1995, Ziff–Davis Publishing Company 1995.
Frenkel, Gary, "cc:Mail View Keeps an Eye on Your Messaging System", Network Computing, Jun. 1, 1995, CMP Publications, Inc., 1995.

Primary Examiner—Frank J. Asta
Assistant Examiner—Daniel Patru
Attorney, Agent, or Firm—Workman, Nydegger & Seeley

[57] ABSTRACT

A deficiency in a link in a messaging system is detected by sending across the link a request message that includes a coded data string, receiving across the link a reply message that includes the coded data string, and determining whether the travel time involved is excessive. To maximize the likelihood that the coded data string is included in the reply message, the coded data string is preferably included in both the subject and body fields of the request message.

42 Claims, 3 Drawing Sheets

MONITORING A MESSAGING LINK

BACKGROUND OF THE INVENTION

The invention is directed to messaging systems.

A messaging system allows a user to direct a message from a source location, e.g., a messaging server, on the messaging system to a destination location, e.g., another messaging server, on the messaging system. Locations on the messaging system are connected by messaging links. Typically, these links include computer data connections such as network connections in a networked computer system. The message is delivered by transferring the message across one or more of the links to a mailbox located at the destination. The delivery is typically facilitated by router computers and gateway computers that allow the message to be transferred across numerous and disparate interlinked networks, including the Internet.

From time to time, a link in a messaging system develops a deficiency that causes a message delivery failure or a message delivery delay or both. A delivery failure is a failure of a message to arrive at the mailbox to which the message is directed. A delivery delay is a delay in the arrival of the message at the mailbox. A delivery failure or a delivery delay can occur if, e.g., the messaging system develops a computer hardware deficiency or a configuration deficiency that causes a message destination to become insufficiently connected with the messaging system. Such a failure or delay can also be caused by a deficiency involving computer software used in the messaging system. In addition, a message delivery delay can occur due to a significant increase in the link's message traffic, i.e., the volume of messages transferred across the link during a time period. Furthermore, if the link includes cables or wires, a delivery failure or delay can occur as a result of damage or wear involving the cables or wires.

SUMMARY OF THE INVENTION

A technique is provided for monitoring links in a messaging system to detect deficiencies involved with delivering messages from a source to a destination across the links. A link is tested for deficiencies by sending a test message to a server across the link and making determinations after a reply is received or after a reply is expected. The reply preferably includes timestamp information that is used to calculate components of a round-trip time. A coded data string, indicating at least the sending time of the test message, is preferably placed in both the subject and body fields of the test message. Depending on the type of server, the test message is sent to a special-purpose message response program at the server or is set up to provoke a "could not deliver" reply from the server.

A procedure for monitoring a link is provided that allows for frequent monitoring of multiple links, because the procedure allows test messages to overlap in time.

The procedure is able to use a reply message as the sole basis of information on which to rely to make a determination about the link corresponding to the reply. The procedure can so rely because the reply message is expected to include a coded data string that identifies the reply and that indicates the time that the reply's corresponding request was sent.

The procedure is able to test links among different types of servers, including servers that are expressly configured for link monitoring and servers that are not. The procedure is also able to test the bi-directional capabilities of the links.

In one aspect, the invention features a method of detecting a deficiency in a messaging link between a source and a destination, the method including the steps of sending a message from the source, the message intended to provoke a reply from the destination; determining whether a reply is received from the destination; and detecting a deficiency in the link by using the outcome of the determination and, depending on the outcome of the determination, the reply.

Implementations of this aspect of the invention may include one or more of the following features.

The method may further include steps of determining a travel time for the message and using the travel time to detect the deficiency. The method may further include a step of determining a component of the travel time wherein the deficiency is detected using the travel time and the component.

The deficiency may be detected by causing a plurality of non-identical messages to be sent, each message being intended to provoke a reply corresponding to the message. Each message may include a code that is intended to be included in the corresponding reply and replies received may be distinguished using the codes. The code may be included in a subject field of the message or in a body field of the message.

The reply may include an error message sent from the destination, information about when the message was sent, and information about when the message arrived at the destination.

A request handler may be located at the destination, the message may be sent to the request handler, and the request handler may generate the reply. The reply may include information about when the message arrived at the destination.

An undeliverable message handler may be located at the destination, the message may include an invalid mailbox identifier, the message may be sent to the undeliverable message handler, and the undeliverable message handler may generate the reply, the reply including an error message.

The message may include a plurality of copies of the code and the reply may include at least one copy of the code.

The method may further include steps of determining a round-trip time for the message and using the round-trip time to detect the deficiency. The reply may include information about when the message arrived at the destination and when the reply was sent from the destination. The method may further include steps of determining, using the information about when the message arrived and the information about when the reply was sent, a turnaround time, and using the turnaround time to adjust the round-trip time.

Each message may include a timestamp code that is intended to be included in the corresponding reply, the timestamp code being included in the message's subject or body field. The method may further include a step of using the timestamp code to detect the deficiency.

The method may further include steps of determining whether the reply is consistent with the destination and using the outcome of the determination to detect the deficiency. The message may include a code that is intended to be included in the reply and the code may be used in the determination of whether the reply is consistent with the destination. The reply may include a code identifying the destination and the code may be used in the determination of whether the reply is consistent with the destination.

The outcome of the determination and the reply may be the only bases of information relied upon to detect the deficiency. The outcome of the determination may depend on whether a pre-selected period of time passes without receipt of a reply.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
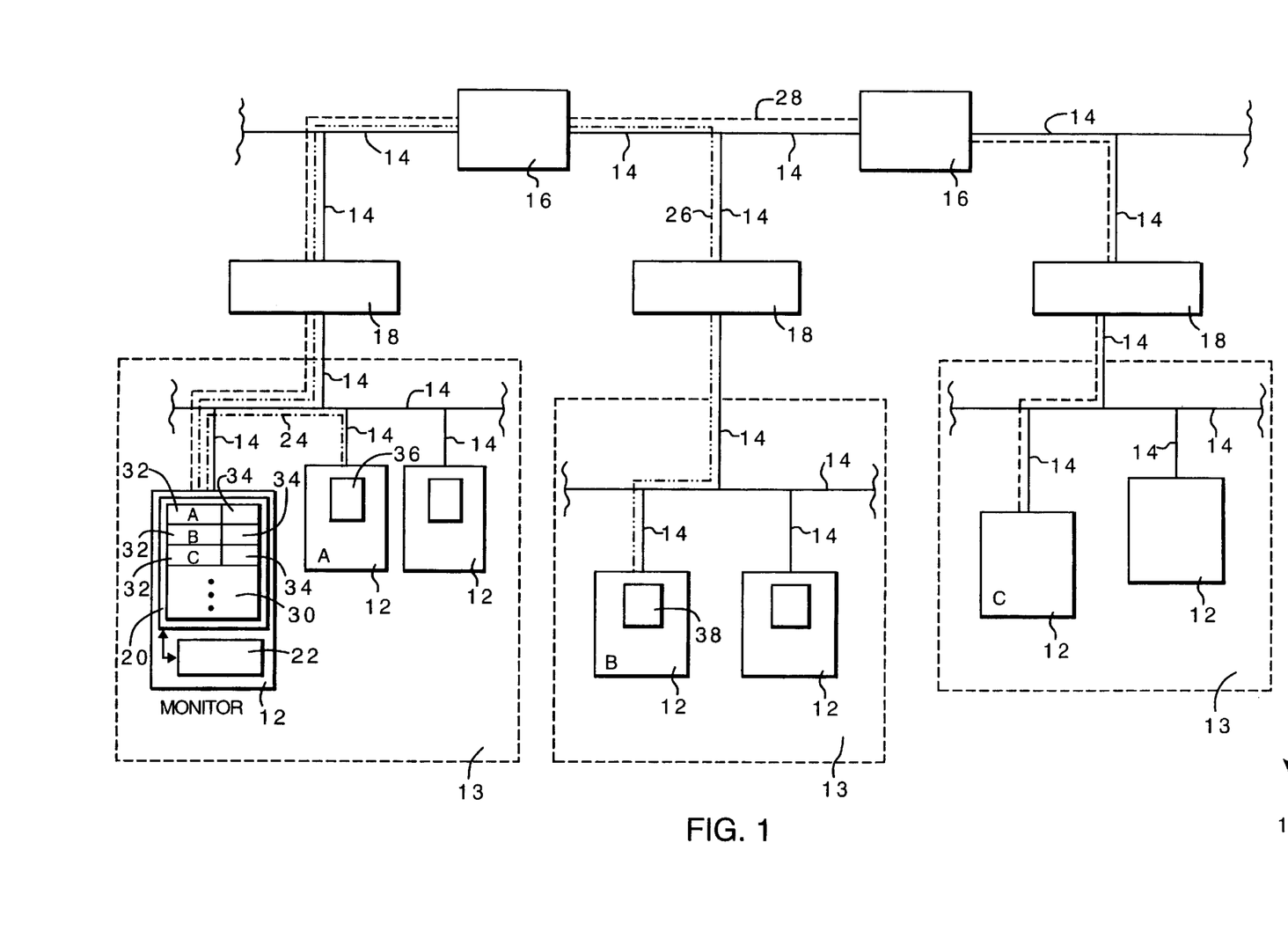
FIG. 1 is a block diagram of a messaging system.

FIG. 1 illustrates a messaging system 10 that includes messaging servers 12 and local networks 13 that are linked by network connections 14, messaging routers 16, and messaging gateways 18. At least one of the servers is a monitoring server that runs monitoring software 20 that can direct a messaging program 22 to send a message from the monitoring server to another server, e.g., server A, B, or C, in the messaging system. A message sent to server A, for example, travels along an intranetwork link 24 that includes network connections. Messages sent to servers B and C travel along internetwork links 26, 28 that include gateways and routers as well as network connections. The links are bi-directional, so servers A, B, and C can send messages, including replies, to the monitoring server across the same links 24, 26, 28.

The monitoring software monitors links between servers on the messaging system to detect link-related deficiencies that cause message delivery failures and message delivery delays. Associated with the software is a directory 30 of monitored links. The directory has an entry 32 for each link to be monitored by the software. Each such link is identified in the directory by the link's association with a particular server. For example, an identifier corresponding to server B is used to identify the entry for the link 26 to server B.

As described below, the software detects the deficiencies in each monitored link by periodically causing the execution of a detection cycle. In the detection cycle, the software directs the messaging program to send a request message to the target server, i.e., the server associated with the monitored link. For example, to monitor the link 24 to server A, the software periodically causes a request message to be sent to server A. The request message, also described below, is intended to provoke the target server into sending a reply message back to the monitoring server. If no reply is received from the target server, the software terminates the detection cycle and reports a detection of a link deficiency involving a message deliver failure.

On the other hand, if a reply is received from the target server, a full detection cycle is complete. At that point, depending on the information included in the reply, the software determines various times involved in the cycle, including a round-trip time. The round-trip time, for example, is then compared with a reference round-trip time. If the round-trip time is excessive, the software reports a detection of a link deficiency involving a message delivery delay.

For each cycle, depending on the capabilities of the target server, the monitoring software determines other times in addition to the round-trip time. The capabilities of each target server are noted in a description 34 that is associated with the server's entry 32 in the directory 30. In particular, the description indicates the reply capabilities of the target server.

One type of target server is an enhanced-reply server, e.g., server A. Server A runs a monitoring reply program 36 that is started on server A before monitoring begins. The monitoring reply program recognizes the request message as a message involved in a detection cycle and is able to send a reply message. The reply message includes a request-sent indicator showing the time that the request message was sent, a request-received indicator showing the time that the request message was received at the target server, and a reply-sent indicator showing the time that the reply was sent back to the monitoring server.

Another type of target server is a bounce-reply server, e.g., server B. Server B runs a message-bounce program 38 that is started before monitoring begins and that generates a reply to every message received by the program. The reply to the request includes at least a request-sent indicator and a reply-sent indicator.

A third type of target server is a non-deliverable-message ("NDR") reply server, e.g., server C. An NDR-reply server is a server that is running neither a monitoring reply program nor a message-bounce program. However, such a server, like most messaging servers, runs an NDR program. In general, the NDR program is invoked when a message arrives at the server with a defect such as an invalid mailbox identifier, which is a mailbox identifier that does not correspond to a mailbox located at the server. In such an instance, the NDR program sends a "could not deliver" message back to the message's sender. Thus, to provoke a reply from such a server, the monitoring software makes use of the server's NDR service by sending the request with a known invalid mailbox identifier. In response, the NDR-reply server's NDR program sends a "could not deliver" reply that includes a reply-sent indicator and, depending on the particular server, a request-sent indicator.

Figure 2:
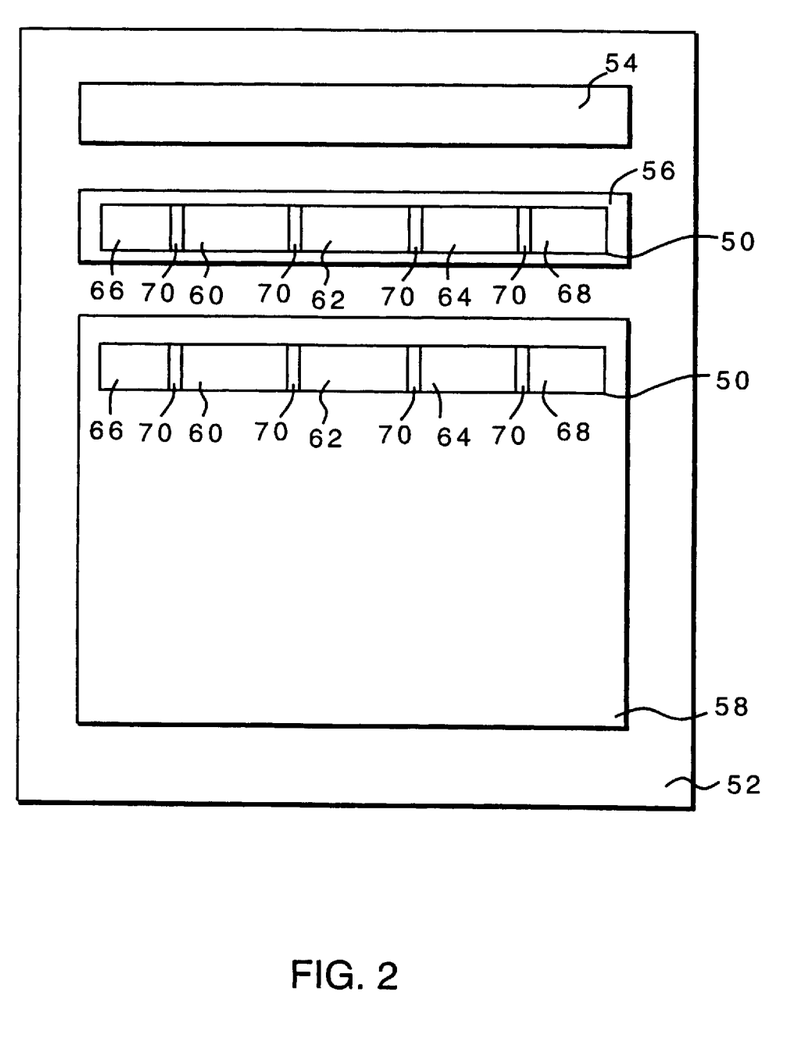
FIG. 2 is a block diagram of a message and a coded data string.

To maximize the likelihood that the reply includes a request-sent indicator and to allow detection cycles to overlap in time, the monitoring software preferably uses, as shown in FIG. 2, a coded data string 50, described below. The monitoring software directs the messaging program to include the string in the request message 52. The request message, like most messages in messaging systems, includes an address field 54, a subject field 56, and a message body field 58.

The string includes a signature code 60 that uniquely identifies the request message, an identifier code 62 that points to the target server's entry in the directory, and a timestamp code 64 that includes a request-sent indicator. The signature code and the identifier code are preferably hexadecimal representations of 32-bit numbers, e.g., "OFFD985A". The timestamp code preferably has a format such as "1996.05.17 05:23:33". The codes are preferably bounded by a header 66, preferably "Mb>:", and a footer 68, preferably "<Mb". The header, codes, and footer are preferably delimited by spaces 70.

The timestamp code is important because, although replies from enhanced-reply servers and bounce-reply servers are expected to include a request-sent indicator, replies from NDR-reply servers are less likely to so include. A request-sent indicator is expected to be included in replies from enhanced-reply servers and bounce-reply servers because the servers' monitoring-reply and message-bounce programs are set up for the express purpose of accommodating monitoring. Conversely, an NDR program relied upon in an NDR-reply server is set up for the general purpose of alerting a message sender to the fact that the sender used an invalid mailbox identifier. Therefore, for example, the NDR program may not include the entire request message in the reply message but may retain only the request message's subject field or body field. Commonly, in a reply from an NDR-reply server, a request-sent indicator is lost completely and text announcing the invalid mailbox replaces the subject or body field that is lost. To maximize the likelihood that the coded data string is included in the reply, the string is preferably included in both the subject field and the body field of the request. Thus, because the timestamp code is included in the string, the likelihood that a request-sent indicator is included in the reply is also maximized.

The identifier code 62 is important because the identifier code allows the monitoring software to distinguish among reply messages arriving from different target servers. Thus, detection cycles for multiple target servers can overlap in time. For example, with reference to FIG. 1, a request message with an identifier for server A may be sent to server A at the same time another request message with an identifier for server B is sent to server B. In such a case, the monitoring software expects replies from both servers. As long as the string is included in the replies, the identifier code allows the replies to be distinguished when the replies arrive back at the monitoring server.

The signature code 60 is similarly important because the signature code allows the monitoring software to distinguish among reply messages arriving from the same target server. Thus, multiple detection cycles for the same target server can overlap in time. For example, with reference to FIG. 1, the monitoring software 20 can send a request message to server B before receiving a reply to an earlier request message. In such a case, although more than one reply message is outstanding for server B, the software can easily determine, by reference to the signature code, to which of the two request messages the next arriving reply corresponds.

Figure 3:
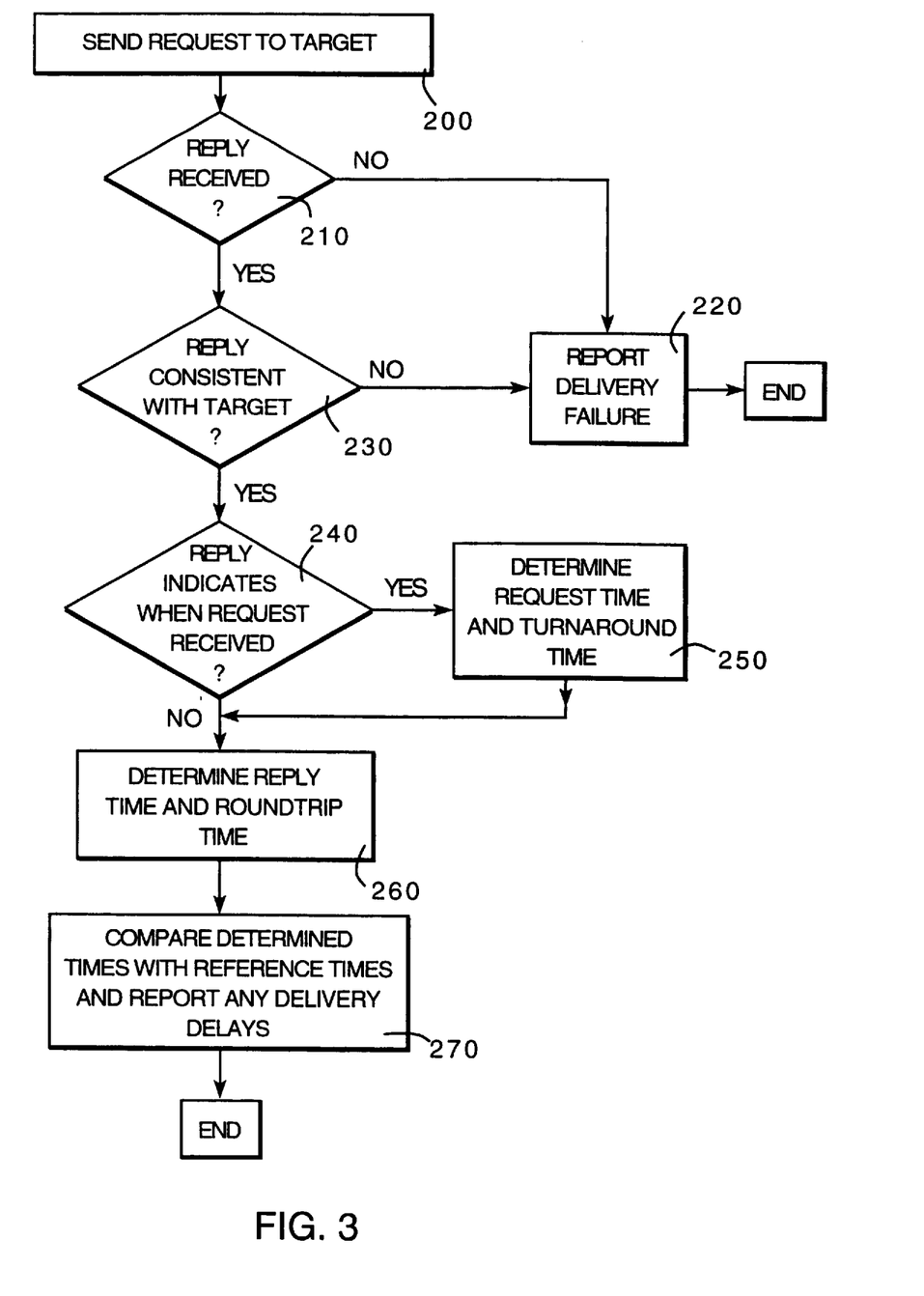
FIG. 3 is a flow chart of a procedure for detecting a deficiency in a messaging link.

The codes are used in a procedure illustrated in FIG. 3 to detect deficiencies in a link associated with a target server.

First, the monitoring software directs the messaging program to send a request message (step 200). The subject and body fields of the request message include the coded data string as described above. The contents of message's address field are determined by reference to the directory. If the target server's directory entry indicates that the target server is an enhanced-reply server, the message's address field is set up to direct the message to the server's monitoring reply program. If the target server's entry indicates that the target server is a bounce-reply server, the message's address field is set up to direct the message to the server's message-bounce program. If the target server's entry indicates that the target server is neither an enhanced-reply nor a bounce-reply server, i.e., is an NDR-reply server, the message's address field is set up to provoke an NDR message from the server. Thus, in the case of an NDR-reply server, the address field is set up to include a mailbox identifier that does not correspond to a mailbox located at the target server, i.e., to include a known invalid mailbox identifier.

After the request message is sent, the software determines whether a reply message has been received from the target server (step 210). As noted above, the software refers to a reply message's signature code to identify the reply message with a particular request message. If a reply message is not received, i.e., if a pre-selected amount of time passes without a reply from the target server, the detection cycle is terminated and the software reports a message delivery failure (step 220). Such a report indicates that a deficiency in the link caused either (1) a failure of the request message to reach the target server or (2) a failure of the target server's reply message to reach the monitoring server.

If, on the other hand, a reply message is received, the software records, for later use as described below, the time that the reply was received, i.e., a reply-received indicator, and determines whether the reply message is consistent with the target server (step 230). For example, if the request message was directed to an enhanced-reply server, the software expects to receive a reply message that includes particular information. That information, as described above, includes a request-received indicator. Furthermore, also as described above with respect to enhanced-reply and bounce-reply servers, the software expects the reply to include the coded data string in both the subject and body fields of the reply. As a result, at least in the cases of enhanced-reply and bounce-reply servers, the software can determine whether the reply is consistent with the target server. Such a determination is important, especially when the link to the target server includes at least one router or gateway. For example, a deficiency in the link can cause the router or gateway to generate, in response to the request message, a false reply message analogous to an NDR reply. Unlike an actual reply message, a false reply message does not indicate that the request message successfully reached the target server. Therefore, determining whether the reply message is consistent with the target server allows the software to determine whether the reply message is a false reply message. If consistency is not found, the detection cycle is terminated and the software reports a message delivery failure (step 220).

However, if consistency is found, the software then determines if the reply message includes a request-received indicator (step 240). Such an indicator is necessary for determining (1) the travel time of the request message's trip from the monitoring server to the target server, i.e., the request time, and (2) the amount of time that the target server required, after receiving the request message, to generate the reply message, i.e., the turnaround time. As noted above, if the target server is an enhanced-reply server, the reply message is expected to include a request-received indicator. Also, depending on the characteristics of the particular server, the reply message may so include if generated by a bounce-reply server.

If the reply message includes a request-received indicator, the software then determines the request time and the turnaround time (step 250). As mentioned above, a request-sent indicator and a reply-sent indicator are expected to be included in all reply messages. The request time is determined by taking the difference between the time indicated by the request-received indicator and the time indicated by the request-sent indicator. The turnaround time is determined by taking the difference between the time indicated by the reply-sent indicator and the time indicated by the request-received indicator.

Regardless of whether the reply message includes a request-received indicator, the software then determines a reply time and the round-trip time (step 260). The reply time is the amount of time that the reply message required to travel from the target server to the monitoring server. The round-trip time is determined by taking the difference between the time indicated by the reply-received indicator and the time indicated by the request-sent indicator. The reply time is determined by taking the difference between the time indicated by the reply-received indicator and the time indicated by the reply-sent indicator.

Finally, the software compares the determined times with corresponding reference times and reports delivery delays, if any (step 270). The reference times are preselected when the monitoring software is started on the monitoring server. For example, a round-trip reference time of one hour may be sufficient for detecting a deficiency in the link. If so, the software reports a delivery delay if the determined round-trip time is greater than one hour.

Other embodiments are within the scope of the following claims. For example, if the software is able to determine a request time and a turnaround time as described above, the software may use a sophisticated decision service with respect to reporting a delivery delay. The decision service may expect that the round-trip time is the sum of the request time, the turnaround time, and the reply time. In such a case, the monitoring software that is monitoring the link may be concerned more with the request time and the reply time, which relate directly to travel time across the link, than with the turnaround time, which does not. If so, the decision service may not, for example, report a delivery delay for a round-trip time over an hour if the turnaround time is more than a half-hour.

Furthermore, the procedure for detecting a deficiency in a link may use a procedure for not only detecting a false reply as described above, but also detecting the source of the false reply. If the source is recognizable to the monitoring software, the software can then point out the source as relating to the link deficiency and the message delivery failure. For example, the source of the false reply may be recognizable to the monitoring software if the false reply includes a text string that the monitoring software identifies as the product of a particular router or gateway.

In addition, the procedure for detecting a deficiency in a link may be used in conjunction with a server-monitoring system that detects a deficiency in a server. Furthermore, the procedure may be used in conjunction with a system that takes an action when a link-related or server-related deficiency is detected.

What is claimed is:

1. In a messaging system that includes a plurality of local networks having messaging servers that are linked by messaging gateways and messaging routers, and wherein at least one of the messaging servers is a monitoring server and the other messaging servers are configured as any of several of different types of target servers, including enhanced-reply servers, bounce-reply servers or non-deliverable-message reply (NDR) servers, a method of detecting a deficiency in the form of either a delivery failure or a delivery delay in a messaging link between the monitoring server and any of the different types of target servers, the method comprising the steps of:

sending a test message that includes an encoded data string from the monitoring server to one of the target servers, the test message provoking a reply in the form of the returned encoded data string from the target server irrespective of whether the target server is of the enhanced-reply, bounce-reply or NDR type, said encoded data string comprising signature code means for uniquely identifying the test message, identifier code means for pointing to the target server as identified by information located at the monitoring server, and timestamp code means for providing a request-sent indicator;

formatting said test message to form a subject field and a body field, and including in both the subject field and the body field said encoded data string so that the encoded data string is likely to be returned in a reply from the target server irrespective of the target server's type, unless a deficiency is detected;

determining whether a reply is received from the target server; and detecting whether there is a deficiency in the messaging link by using the encoded data string.

2. The method of claim 1, wherein the method further comprises steps of:

determining a travel time for the test message; and using the travel time to detect the deficiency.

3. The method of claim 2, wherein the method further comprises a step of determining a component of the travel time; and the deficiency is detected using the travel time and the component.

4. The method of claim 1, wherein the deficiency is detected by causing a plurality of non-identical test messages to be sent, each test message being intended to provoke a reply corresponding to the test message;

each test message comprises a code that is intended to be included in the corresponding reply; and replies received are distinguished using the codes.

5. The method of claim 1, wherein the reply comprises an error message sent from the target server.

6. The method of claim 4, wherein a subject field of the test message comprises the code.

7. The method of claim 4, wherein a body field of the message comprises the test message comprises the code.

8. The method of claim 1, wherein the reply comprises information about when the test message was sent.

9. The method of claim 1, wherein the reply comprises information about when the test message arrived at the target server.

10. The method of claim 1, wherein a request handler is located at the target server;

the test message is sent to the request handler; and the request handler generates the reply.

11. The method of claim 10, wherein the reply comprises information about when the test message arrived at the destination.

12. The method of claim 1, wherein an undeliverable test message handler is located at the target server;

the test message comprises an invalid mailbox identifier;

the test message is sent to the undeliverable message handler; and the undeliverable message handler generates the reply, the reply comprising an error message.

13. The method of claim 4, wherein the test message comprises a plurality of copies of the code and the reply comprises at least one copy of the code.

14. The method of claim 1, wherein the method further comprises steps of:

determining a round-trip time for the test message; and using the round-trip time to detect the deficiency.

15. The method of claim 14, wherein the reply comprises information about when the test message arrived at the target server and when the reply was sent from the target server; and the method further comprises steps of determining, using the information about when the test message arrived at the target server and the information about when the reply was sent from the target server, a turnaround time; and using the turnaround time to adjust the round-trip time.

16. The method of claim 1, wherein the method further comprises a step of using the timestamp code to detect the deficiency.

17. The method of claim 1, wherein the method further comprises steps of:

determining whether the reply is consistent with the target server; and using the outcome of the determination to detect the deficiency.

18. The method of claim 17, wherein the test message comprises a code that is intended to be included in the reply; and the code is used in the determination of whether the reply is consistent with the target server.

19. The method of claim 17, wherein the reply comprises a code identifying the target server; and the code is used in the determination of whether the reply is consistent with the target server.

20. The method of claim 1, wherein the outcome of the determination and the reply are the only bases of information relied upon to detect the deficiency.

21. The method of claim 1, wherein the outcome of the determination depends on whether a pre-selected period of time passes without receipt of a reply.

22. A computer program product for use in a messaging system that includes a plurality of local networks having messaging servers that are linked by messaging gateways and messaging routers, and wherein at least one of the messaging servers is a monitoring server and the other messaging servers are configured as any of several of different types of target servers, including enhanced-reply servers, bounce-reply servers or non-deliverable-message reply (NDR) servers, the computer program product comprising:

a computer usable medium having computer readable program code means embodied in said medium for detecting a deficiency in the form of either a delivery failure or a delivery delay in a messaging link between the monitoring server and any of the different types of target servers; and computer program code means comprising:

program code means for sending a test message that includes an encoded data string from the monitoring server to one of the target servers, the test message provoking a reply in the form of the returned encoded data string from the target server irrespective of whether the target server is of the enhanced-reply, bounce-reply or NDR type, said encoded data string comprising signature code means for uniquely identifying the test message, identifier code means for pointing to the target server as identified by information located at the monitoring server, and timestamp code means for providing a request-sent indicator;

program code means for formatting said test message to form a subject field and a body field, and including in both the subject field and the body field said encoded data string so that the encoded data string is likely to be returned in a reply from the target server irrespective of the target server's types, unless a deficiency is detected;

program code means for determining whether a reply is received from the target server; and program code means for detecting whether there is a deficiency in the messaging link by using the encoded data string.

23. The computer program product of claim 22, further comprising:

program code means for determining a travel time for the test message; and program code means for using the travel time to detect the deficiency.

24. The computer program product of claim 23, wherein the computer program code means further comprises program code means for determining a component of the travel time; and the deficiency is detected using the travel time and the component.

25. The computer program product of claim 22, wherein the deficiency is detected by causing a plurality of non-identical test messages to be sent, each test message being intended to provoke a reply corresponding to the test message;

each test message comprises a code that is intended to be included in the corresponding reply; and replies received are distinguished using the codes.

26. The computer program product of claim 22, wherein the reply comprises an error message sent from the target server.

27. The computer program product of claim 25, wherein a subject field of the test message comprises the code.

28. The computer program product of claim 25, wherein a body field of the test message comprises the code.

29. The computer program product of claim 22, wherein the reply comprises information about when the test message was sent.

30. The computer program product of claim 22, wherein the reply comprises information about when the test message arrived at the target server.

31. The computer program product of claim 22, wherein a request handler is located at the target server;

the test message is sent to the request handler; and the request handler generates the reply.

32. The computer program product of claim 31, wherein the reply comprises information about when the test message arrived at the target server.

33. The computer program product of claim 22, wherein an undeliverable message handler is located at the target server;

the test message comprises an invalid mailbox identifier;

the test message is sent to the undeliverable message handler; and the undeliverable message handler generates the reply, the reply comprising an error message.

34. The computer program product of claim 25, wherein the test message comprises a plurality of copies of the code and the reply comprises at least one copy of the code.

35. The computer program product of claim 22, wherein the computer program code means further comprises program code means for:

determining a round-trip time for the test message; and using the round-trip time to detect the deficiency.

36. The computer program product of claim 35, wherein the reply includes information about when the test message arrived at the target server and when the reply was sent from the target server; and the computer program code means further comprises:

program code means for determining, using the information about when the test message arrived at the target server and the information about when the reply was sent from the target server, a turnaround time; and program code means for using the turnaround time to adjust the round-trip time.

37. The computer program product of claim 22, wherein the computer program code means further comprises program code means for using the timestamp code to detect the deficiency.

38. The computer program product of claim 22, wherein the computer program code means further comprises:

program code means for determining whether the reply is consistent with the target server; and program code means for using the outcome of the determination to detect the deficiency.

39. The computer program product of claim 38, wherein the test message comprises a code that is intended to be included in the reply; and the code is used in the determination of whether the reply is consistent with the target server.

40. The computer program product of claim 38, wherein the reply comprises a code identifying the target server; and the code is used in the determination of whether the reply is consistent with the target server.

41. The computer program product of claim 22, wherein the outcome of the determination and the reply are the only bases of information relied upon to detect the deficiency.

42. The computer program product of claim 22, wherein the outcome of the determination depends on whether a pre-selected period of time passes without receipt of a reply.

* * * * *

UNITED STATES PATENT AND TRADEMARK OFFICE
CERTIFICATE OF CORRECTION

PATENT NO. : 5,870,556
DATED : Feb. 9, 1999
INVENTOR(S) : Cote et al.

It is certified that error appears in the above-identified patent and that said Letters Patent is hereby corrected as shown below:

Col. 4, line 13, after "message" change "deliver" to --delivery--

Signed and Sealed this

First Day of February, 2000

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO.   : 5,870,556
DATED        : February 9, 1999
INVENTOR(S)  : Joseph Paul-Emile Pierre Cote and Stephen David Thomas Page 1 of 1

It is certified that error appears in the above-identified patent and that said Letters Patent is hereby corrected as shown below:

Title page,
Inventors, after "Bellevue" change "both" to -- Steve Master, Kent, all --

Signed and Sealed this

Twenty-fifth Day of December, 2001

Attest:

*Attesting Officer*

JAMES E. ROGAN
*Director of the United States Patent and Trademark Office*